US009705823B2

(12) United States Patent
Li

(10) Patent No.: US 9,705,823 B2
(45) Date of Patent: Jul. 11, 2017

(54) PORT STATUS SYNCHRONIZATION METHOD, RELATED DEVICE, AND SYSTEM

(71) Applicant: Huawei Technologies Co., Ltd., Shenzhen (CN)

(72) Inventor: Yutao Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/066,615

(22) Filed: Mar. 10, 2016

(65) Prior Publication Data

US 2016/0197856 A1 Jul. 7, 2016

Related U.S. Application Data

(63) Continuation of application No. PCT/CN2014/078439, filed on May 26, 2014.

(30) Foreign Application Priority Data

Sep. 13, 2013 (CN) .......................... 2013 1 0419659

(51) Int. Cl.
*H04L 12/935* (2013.01)
*H04L 12/721* (2013.01)
(Continued)

(52) U.S. Cl.
CPC .......... *H04L 49/3054* (2013.01); *H04L 12/24* (2013.01); *H04L 12/28* (2013.01);
(Continued)

(58) Field of Classification Search
CPC ......... H04L 45/66; H04L 45/74; H04L 84/12; H04L 12/28; H04L 12/24; H04L 29/06;
(Continued)

(56) References Cited

U.S. PATENT DOCUMENTS 6,222,852 B1 * 4/2001 Gandy .............. H04L 12/40136
341/110
7,428,599 B2 9/2008 Shahdadpuri et al.
(Continued)

FOREIGN PATENT DOCUMENTS

CN 1591290 A 3/2005
CN 1592255 A 3/2005
(Continued)

OTHER PUBLICATIONS

Foreign Communication From A Counterpart Application, European Application No. 14844577.8, Extended European Search Report dated Jul. 12, 2016, 9 pages.
(Continued)

*Primary Examiner* — Ian N Moore
*Assistant Examiner* — Mewale Ambaye
(74) *Attorney, Agent, or Firm* — Conley Rose, P.C.

(57) ABSTRACT

A port status synchronization method, related device, and system, where a physical layer (PHY) device or an external processor connected to the PHY device determines whether a first service interface of the PHY device changes, and when the first service interface changes, controls a second service interface of the PHY device to restart auto-negotiation and sends, using the second service interface, an auto-negotiation advertisement packet to a first device connected to the second service interface in order to trigger the first device to synchronize, according to the auto-negotiation advertisement packet, a status of the second service interface and a status of the first service interface such that performing port status negotiation and synchronization between a link layer (media access control (MAC)) device or the first device and the PHY device using a service interface is achieved, without a need of disposing a management data input/output (MDIO) interface.

20 Claims, 8 Drawing Sheets

(51) Int. Cl.
*H04W 76/02* (2009.01)
*H04L 12/28* (2006.01)
*H04W 28/02* (2009.01)
*H04W 72/12* (2009.01)
*H04L 12/24* (2006.01)
*H04L 29/06* (2006.01)

(52) U.S. Cl.
CPC .............. *H04L 29/06* (2013.01); *H04L 41/00* (2013.01); *H04L 41/12* (2013.01); *H04L 45/66* (2013.01); *H04W 28/0289* (2013.01); *H04W 72/12* (2013.01); *H04W 76/02* (2013.01)

(58) Field of Classification Search
CPC .. H04L 41/12; H04W 28/0289; H04W 72/12; H04W 76/02
See application file for complete search history.

(56) References Cited

U.S. PATENT DOCUMENTS

| | | | |
|---|---|---|---|
| 2002/0181633 | A1 | 12/2002 | Trans |
| 2003/0117958 | A1* | 6/2003 | Nation .................. H04L 47/10 370/235 |
| 2006/0153238 | A1 | 7/2006 | Bar-On et al. |
| 2007/0086450 | A1 | 4/2007 | Baumer et al. |
| 2010/0142562 | A1* | 6/2010 | Ito ...................... G06F 13/4291 370/503 |
| 2011/0007739 | A1 | 1/2011 | Diab et al. |
| 2012/0328289 | A1* | 12/2012 | Julien .................. H04L 49/557 398/45 |

FOREIGN PATENT DOCUMENTS

| | | |
|---|---|---|
| CN | 1859155 A | 11/2006 |
| CN | 1953458 A | 4/2007 |
| CN | 101047712 A | 10/2007 |
| CN | 101146104 A | 3/2008 |
| CN | 101159534 A | 4/2008 |
| CN | 101163148 A | 4/2008 |
| CN | 102006229 A | 4/2011 |
| CN | 103067151 A | 4/2013 |
| JP | 2003087261 A | 3/2003 |
| JP | 2003198578 A | 7/2003 |
| JP | 2012070037 A | 4/2012 |
| WO | 2005104698 A2 | 11/2005 |
| WO | WO 2005104698 * | 11/2005 |

OTHER PUBLICATIONS

Partial English Translation and Abstract of Japanese Patent Application No. JPA2003087261, Aug. 26, 2016, 10 pages.
Partial English Translation and Abstract of Japanese Patent Application No. JPA2003198578, Aug. 26, 2016, 15 pages.
Partial English Translation and Abstract of Japanese Patent Application No. JPA2012070037, Aug. 26, 2016, 18 pages.
Foreign Communication From A Counterpart Application, Japanese Application No. 2016523983, Japanese Office Action dated Aug. 9, 2016, 3 pages.
Foreign Communication From A Counterpart Application, Japanese Application No. 2016523983, English Translation of Japanese Office Action dated Aug. 9, 2016, 3 pages.
Partial English Translation and Abstract of Chinese Patent Application No. CN001592255, Mar. 30, 2016, 4 pages.
Partial English Translation and Abstract of Chinese Patent Application No. CN1859155, Mar. 31, 2016, 15 pages.
Partial English Translation and Abstract of Chinese Patent Application No. CN101047712, Mar. 31, 2016, 10 pages.
Foreign Communication From A Counterpart Application, Chinese Application No. 201310419659.6, Chinese Office Action dated Mar. 3, 2016, 3 pages.
Foreign Communication From A Counterpart Application, Chinese Application No. 201310419659.6, Chinese Search Report dated Dec. 9, 2015, 2 pages.
Foreign Communication From A Counterpart Application, PCT Application No. PCT/CN2014/078439, English Translation of International Search Report dated Sep. 5, 2014, 2 pages.
Foreign Communication From A Counterpart Application, PCT Application No. PCT/CN2014/078439, English Translation of Written Opinion dated Sep. 5, 2014, 6 pages.
"IEEE Standard for Ethernet, Section Three," 2012, 358 pages.

* cited by examiner

PORT STATUS SYNCHRONIZATION METHOD, RELATED DEVICE, AND SYSTEM

CROSS-REFERENCE TO RELATED APPLICATIONS

This application is a continuation of International Application No. PCT/CN2014/078439, filed on May 26, 2014, which claims priority to Chinese Patent Application No. 201310419659.6, filed on Sep. 13, 2013, both of which are hereby incorporated by reference in their entireties.

TECHNICAL FIELD

The present disclosure relates to the field of computer technologies, and in particular, to a port status synchronization method, related device, and system.

BACKGROUND

When a communications device in existing Ethernet is in an application state, generally, transmission of port status information and control management information between a link layer (media access control (MAC)) device and a physical layer (PHY) device is implemented using a management data input/output (MDIO) interface, and service information is transmitted using a service (Ethernet (Eth)) interface between the MAC device and the PHY device. The PHY device includes a system side port and a line side port. The system side port is connected to the MAC device in order to implement the service interface between the MAC device and the PHY device, and the line side port of the PHY device is connected to a peer device in order to implement information transmission between the PHY device and the peer device.

An existing implementation manner for connecting an MDIO interface is as follows. The MAC device is connected to the PHY device using the MDIO interface. The MAC device acquires port status information on a line side and port status information on a system side of the PHY device. The MAC device is connected to an external processor using a control management interface such that the MAC device transmits the port status information on the PHY line side and the port status information on the PHY system side of the PHY device to the external processor, and the external processor delivers an instruction to the MAC device in order to perform configuration management on the PHY device using the MDIO interface between the MAC device and the PHY device, thereby controlling status synchronization between the system side port and the line side port of the PHY device. In an apparatus that implements a connection of such an MDIO interface, the PHY device and the MAC device are disposed on different physical boards. Because quantities of PHY devices and MAC devices that are disposed on each physical board are relatively large, a same quantity of MDIO interfaces as that of the PHY devices or the MAC devices need to be disposed on a backplane to implement a connection of MDIO interfaces between the PHY devices and the MAC devices, thereby consuming a large quantity of hardware resources and wasting space for backplane cabling.

In another existing implementation method for connecting a management data interface, a system device management module independent of an external processor is disposed such that a quantity of information transmission paths is relatively large, a signal connection is complex and troublesome, thereby increasing a communications node, further increasing a processing delay of a signal, and reducing reliability of communication between a link layer and a physical layer.

SUMMARY

Embodiments of the present application provide a port status synchronization method, related device, and system such that troublesome design of a circuit interface between a PHY device and a MAC device is simplified, and a system side port or a line side port of the PHY device as a service interface, without a need of an extra service interface, thereby reducing costs; at least two system side ports connected to different MAC devices are disposed, thereby expanding an interface and reducing space for backplane cabling, and a management module is saved in order to reduce an information exchange node and simplify an information transmission path, thereby reducing a signal processing delay and enhancing reliability of management information transmission.

According to a first aspect, an embodiment provides a port status synchronization method, where a PHY device and a MAC device are connected using a service interface, and the method includes determining, by the PHY device or an external processor connected to the PHY device, whether a first service interface of the PHY device changes, and if the first service interface of the PHY device changes, controlling, by the PHY device or the external processor, a second service interface of the PHY device to restart auto-negotiation, and sending, using the second service interface, an auto-negotiation advertisement packet to a first device connected to the second service interface in order to trigger the first device to synchronize, according to the auto-negotiation advertisement packet, a status of the second service interface and a status of the first service interface, where the auto-negotiation advertisement packet includes status information of the first service interface, where if the PHY device and the MAC device are connected using the second service interface, the first device is the MAC device. Otherwise, the first device and the MAC device are different devices.

With reference to the first aspect, in a first possible implementation manner, that the PHY device and the MAC device are connected using a service interface includes that the PHY device and the MAC device are connected using a service interface except a management interface.

With reference to the first possible implementation manner of the first aspect, in a second possible implementation manner, if the first service interface is a line side port of the PHY device, the second service interface is a system side port of the PHY device, and that the PHY device and the MAC device are connected using a service interface includes that the PHY device and the MAC device are connected using the system side port of the PHY device, and the first device is the MAC device connected to the system side port of the PHY device.

With reference to the first possible implementation manner of the first aspect, in a third possible implementation manner, if the first service interface is a system side port of the PHY device, the second service interface is a line side port of the PHY device, and that the PHY device and the MAC device are connected using a service interface includes that the PHY device and the MAC device are connected using the system side port of the PHY device, and the first device is a peer device connected to the line side port of the PHY device.

With reference to the second possible implementation manner or the third possible implementation manner of the first aspect, in a fourth possible implementation manner, a status of the system side port of the PHY device or a status of the line side port of the PHY device includes a port working mode, a port running status, or a control message.

With reference to the fourth possible implementation manner of the first aspect, in a fifth possible implementation manner, at least two system side ports connected to different MAC devices are disposed in the PHY device such that the PHY device is connected to the MAC device using any one of the system side ports that is of the PHY device and is corresponding to the MAC device.

According to a second aspect, an embodiment provides a PHY device, where the PHY device and a MAC device are connected using a service interface, the PHY device includes a first service interface and a second service interface, and the PHY device further includes a determining unit configured to determine whether the first service interface of the PHY device changes, and a control unit configured to control, according to a result that the determining unit determines that the first service interface of the PHY device changes, the second service interface of the PHY device to restart auto-negotiation, and send, using the second service interface, an auto-negotiation advertisement packet to a first device connected to the second service interface in order to trigger the first device to synchronize, according to the auto-negotiation advertisement packet, a status of the second service interface and a status of the first service interface, where the auto-negotiation advertisement packet includes status information of the first service interface, where if the PHY device and the MAC device are connected using the second service interface, the first device is the MAC device. Otherwise, the first device and the MAC device are different devices.

With reference to the second aspect, in a first possible implementation manner, that the PHY device and the MAC device are connected using a service interface includes that the PHY device and the MAC device are connected using a service interface except a management interface.

With reference to the first possible implementation manner of the second aspect, in a second possible implementation manner, if the first service interface is a line side port of the PHY device, the second service interface is a system side port of the PHY device, and that the PHY device and the MAC device are connected using a service interface includes that the PHY device and the MAC device are connected using the system side port of the PHY device, and the first device is the MAC device connected to the system side port of the PHY device.

With reference to the first possible implementation manner of the second aspect, in a third possible implementation manner, if the first service interface is a system side port of the PHY device, the second service interface is a line side port of the PHY device, and that the PHY device and the MAC device are connected using a service interface includes that the PHY device and the MAC device are connected using the system side port of the PHY device, and the first device is a peer device connected to the line side port of the PHY device.

With reference to the second possible implementation manner or the third possible implementation manner of the second aspect, in a fourth possible implementation manner, a status of the system side port of the PHY device or a status of the line side port of the PHY device includes a port working mode, a port running status, or a control message.

With reference to the fourth possible implementation manner of the second aspect, in a fifth possible implementation manner, at least two system side ports connected to different MAC devices are disposed in the PHY device such that the PHY device is connected to the MAC device using any one of the system side ports that is of the PHY device and is corresponding to the MAC device.

According to a third aspect, an embodiment provides a port status synchronization system, including a PHY device and a MAC device, where the PHY device and the MAC device are connected using a service interface, and the PHY device includes a first service interface and a second service interface. The PHY device is configured to determine whether the first service interface of the PHY device changes, and the PHY device is further configured to control, according to a result that the PHY device determines that the first service interface of the PHY device changes, the second service interface of the PHY device to restart auto-negotiation, and send, using the second service interface, an auto-negotiation advertisement packet to a first device connected to the second service interface in order to trigger the first device to synchronize, according to the auto-negotiation advertisement packet, a status of the second service interface and a status of the first service interface, where the auto-negotiation advertisement packet includes status information of the first service interface, where if the PHY device and the MAC device are connected using the second service interface, the first device is the MAC device. Otherwise, the first device and the MAC device are different devices.

With reference to the third aspect, in a first possible implementation manner, the system further includes an external processor, where the external processor is connected to the PHY device, and is configured to replace the PHY device to determine whether the first service interface of the PHY device changes, and the external processor is further configured to replace the PHY device to control, according to a result that the external processor determines that the first service interface of the PHY device changes, the second service interface of the PHY device to restart auto-negotiation, and send, using the second service interface, an auto-negotiation advertisement packet to the first device connected to the second service interface.

With reference to the third aspect or the first possible implementation manner of the third aspect, in a second possible implementation manner, that the PHY device and the MAC device are connected using a service interface includes that the PHY device and the MAC device are connected using a service interface except a management interface.

With reference to the second possible implementation manner of the third aspect, in a third possible implementation manner, if the first service interface is a line side port of the PHY device, the second service interface is a system side port of the PHY device, and that the PHY device and the MAC device are connected using a service interface includes that the PHY device and the MAC device are connected using the system side port of the PHY device, and the first device is the MAC device connected to the system side port of the PHY device.

With reference to the second possible implementation manner of the third aspect, in a fourth possible implementation manner, if the first service interface is a system side port of the PHY device, the second service interface is a line side port of the PHY device, and that the PHY device and the MAC device are connected using a service interface includes that the PHY device and the link layer MAC device are connected using the system side port of the PHY device, and the first device is a peer device connected to the line side port of the PHY device.

With reference to the fourth possible implementation manner of the third aspect, in a fifth possible implementation manner, a status of the system side port of the PHY device or a status of the line side port of the PHY device includes a port working mode, a port running status, or a control message.

With reference to the fifth possible implementation manner of the third aspect, in a sixth possible implementation manner, at least two system side ports connected to different MAC devices are disposed in the PHY device such that the PHY device is connected to the MAC device using any one of the system side ports that is of the PHY device and is corresponding to the MAC device.

According to the embodiments, the PHY device or an external processor connected to the PHY device determines whether a first service interface of the PHY device changes. If the first service interface of the PHY device changes, the PHY device or the external processor controls a second service interface of the PHY device to restart auto-negotiation and sends, using the second service interface, an auto-negotiation advertisement packet to a first device connected to the second service interface in order to trigger the first device to synchronize, according to the auto-negotiation advertisement packet, a status of the second service interface and a status of the first service interface, where the auto-negotiation advertisement packet includes status information of the first service interface. In this way, a purpose of performing port status synchronization and negotiation between a MAC device or a peer device of the PHY device and the PHY device using a service interface is achieved, without a need of disposing an MDIO interface to connect the PHY device and the MAC device, thereby simplifying troublesome design of a circuit interface when the PHY device exchanges management information with the MAC device, and reducing space for signal cabling of an interface board. In the embodiments, an extra management channel and management module do not need to be disposed to connect the PHY device and the MAC device, thereby reducing an information exchange node during communication, simplifying an information transmission path, reducing an information transmission delay, receiving available information in a timely manner, and enhancing reliability of management information transmission.

BRIEF DESCRIPTION OF DRAWINGS

To describe the technical solutions in the embodiments of the present application more clearly, the following briefly introduces the accompanying drawings required for describing the embodiments or the prior art. The accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. The described embodiments are merely some but not all of the embodiments of the present application. All other embodiments obtained by a person of ordinary skill in the art based on the embodiments of the present application without creative efforts shall fall within the protection scope of the present application.

The following provides detailed descriptions using specific embodiments.

Figure 1:
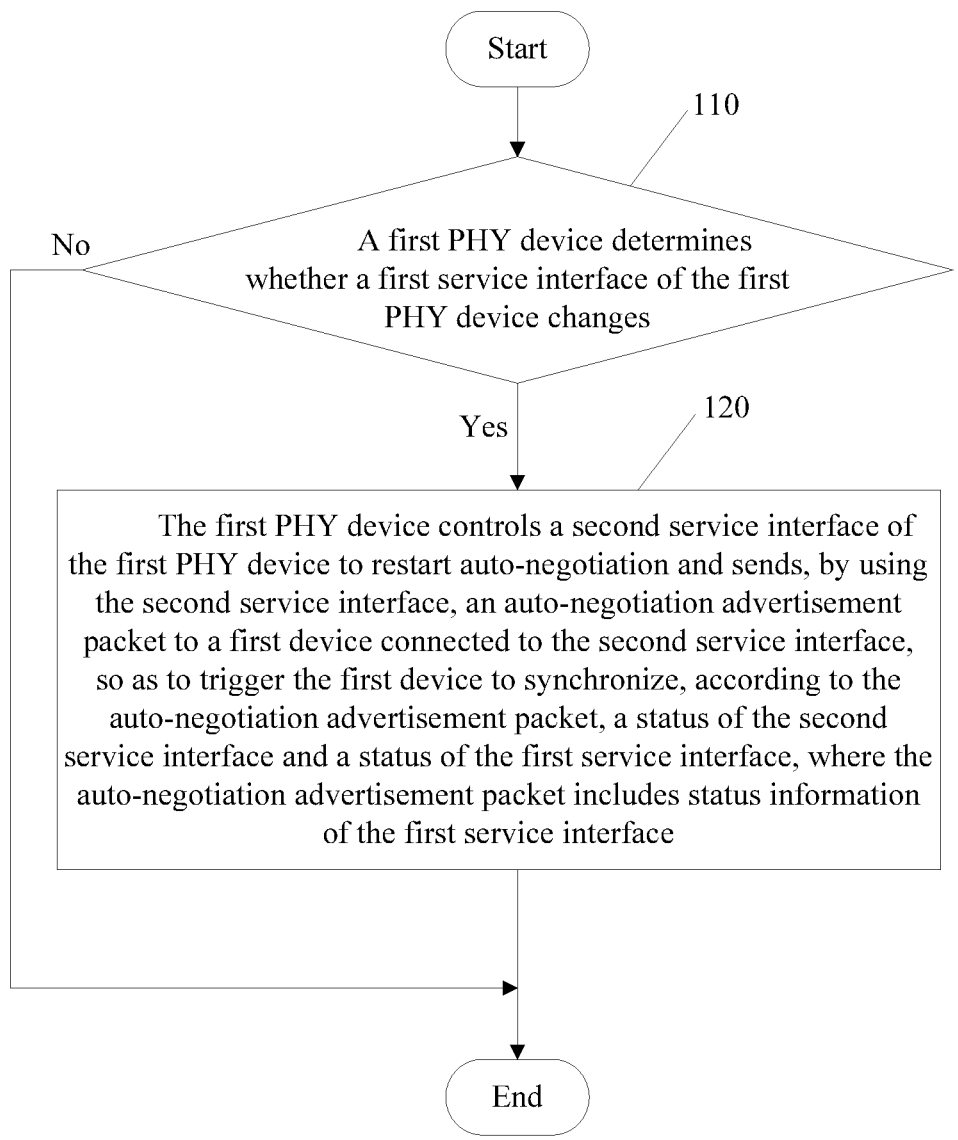
FIG. 1 is a flowchart of a port status synchronization method according to an embodiment of the present disclosure.

Referring to FIG. 1, FIG. 1 is a flowchart of a port status synchronization method according to an embodiment of the present disclosure. In the port status synchronization method provided in this embodiment, involved devices include a local device and a peer device. The local device includes a first MAC device and a first PHY device, where the first PHY device and the first MAC device are connected using a service interface. In this embodiment, the first PHY device includes two service interfaces, which are a first service interface and a second service interface. In this embodiment, the first service interface is a system side port and the second service interface is a line side port, the first MAC device is connected to the first PHY device using the system side port of the first PHY device, that is, the first MAC device is connected to the first PHY device using the first service interface of the first PHY device, and the first PHY device is connected to the peer device using the line side port of the first PHY device, that is, the first PHY device is connected to the peer device using the second service interface of the first PHY device.

As shown in FIG. 1, the port status synchronization method provided in this embodiment is described using the first PHY device as an entity for performing steps of the method, and the method includes the following steps.

Step 110: The first PHY device determines whether the first service interface of the first PHY device changes. If it is determined that the first service interface of the first PHY device changes, step 120 is performed. If it is determined that the first service interface of the first PHY device does not change, this procedure ends.

Step 120: The first PHY device controls the second service interface of the first PHY device to restart auto-negotiation and sends, using the second service interface, an auto-negotiation advertisement packet to a first device connected to the second service interface in order to trigger the first device to synchronize, according to the auto-negotiation advertisement packet, a status of the second service interface and a status of the first service interface, where the auto-negotiation advertisement packet includes status information of the first service interface.

In this embodiment, if the first PHY device and the first MAC device are connected using the first service interface, the first device connected to the second service interface of the first PHY device is the peer device, that is, if the first PHY device is connected to the peer device using the second service interface of the first PHY device, the first device in step 120 is the peer device. The step described in step 120 is that the first PHY device controls the second service interface of the first PHY device to restart the auto-negotiation and sends, using the second service interface, the auto-negotiation advertisement packet to the peer device connected to the second service interface.

In an optional implementation manner, that the first PHY device and the first MAC device are connected using the service interface includes that the first PHY device and the first MAC device are connected using a service interface except a management interface. That is, in this embodiment, the first PHY device and the first MAC device are not connected using the management interface, but are connected using merely the service interface, where the service interface is not limited to the system side port of the first PHY device, and may be another service interface.

In an optional implementation manner, the service interface between the first MAC device and the first PHY device may be any interface of a serial gigabit media independent interface (SGMII), a serial gigabit PHY interface (1000BASE-X interface), a serial gigabit backplane PHY interface (1000BASE-KX interface), and a serial 10-gigabit backplane PHY interface (10GBASE-KR interface).

In an optional implementation manner, a status of the system side port of the first PHY device or a status of the line side port of the first PHY device includes a port working mode, a port running status, or a control message.

In an optional implementation manner, at least two system side ports connected to different MAC devices are disposed in the first PHY device such that the first PHY device is connected to a MAC device using any one of the system side ports that is of the first PHY device and is corresponding to the MAC device.

In an optional implementation manner, the first MAC device is a device that includes an Ethernet MAC layer function, for example, the first MAC device may be any device of devices such as a network adapter device, a switch device, and a network processor (NP).

In an optional implementation manner, the first PHY device is a device that provides an Ethernet PHY layer interface, for example, the first PHY device may be a device that provides a 1000BASE-X interface, a 1000BASE-KX interface, a 10GBASE-KR interface, or a 10GBASE-short range (SR) interface.

According to this embodiment, a first PHY device determines whether a first service interface of the first PHY device changes. If the first service interface of the first PHY device changes, the first PHY device controls a second service interface of the first PHY device to restart auto-negotiation and sends, using the second service interface of the first PHY device, an auto-negotiation advertisement packet to a first device connected to the second service interface of the first PHY device in order to trigger the first device to synchronize, according to the auto-negotiation advertisement packet, a status of the second service interface of the first PHY device and a status of the first service interface of the first PHY device, where the auto-negotiation advertisement packet includes status information of the first service interface. In this way, a purpose of performing port status synchronization and negotiation between a first MAC device or a peer device of the first PHY device and the first PHY device using a service interface is achieved, without a need of disposing an MDIO interface to connect the first PHY device and the first MAC device, thereby simplifying troublesome design of a circuit interface when the first PHY device exchanges management information with the first MAC device, and reducing space for signal cabling of an interface board. In this embodiment, an extra management channel and management module do not need to be disposed to connect the first PHY device and the first MAC device, thereby reducing an information exchange node during communication, simplifying an information transmission path, reducing an information transmission delay, receiving available information in a timely manner, and enhancing reliability of management information transmission.

Figure 2:
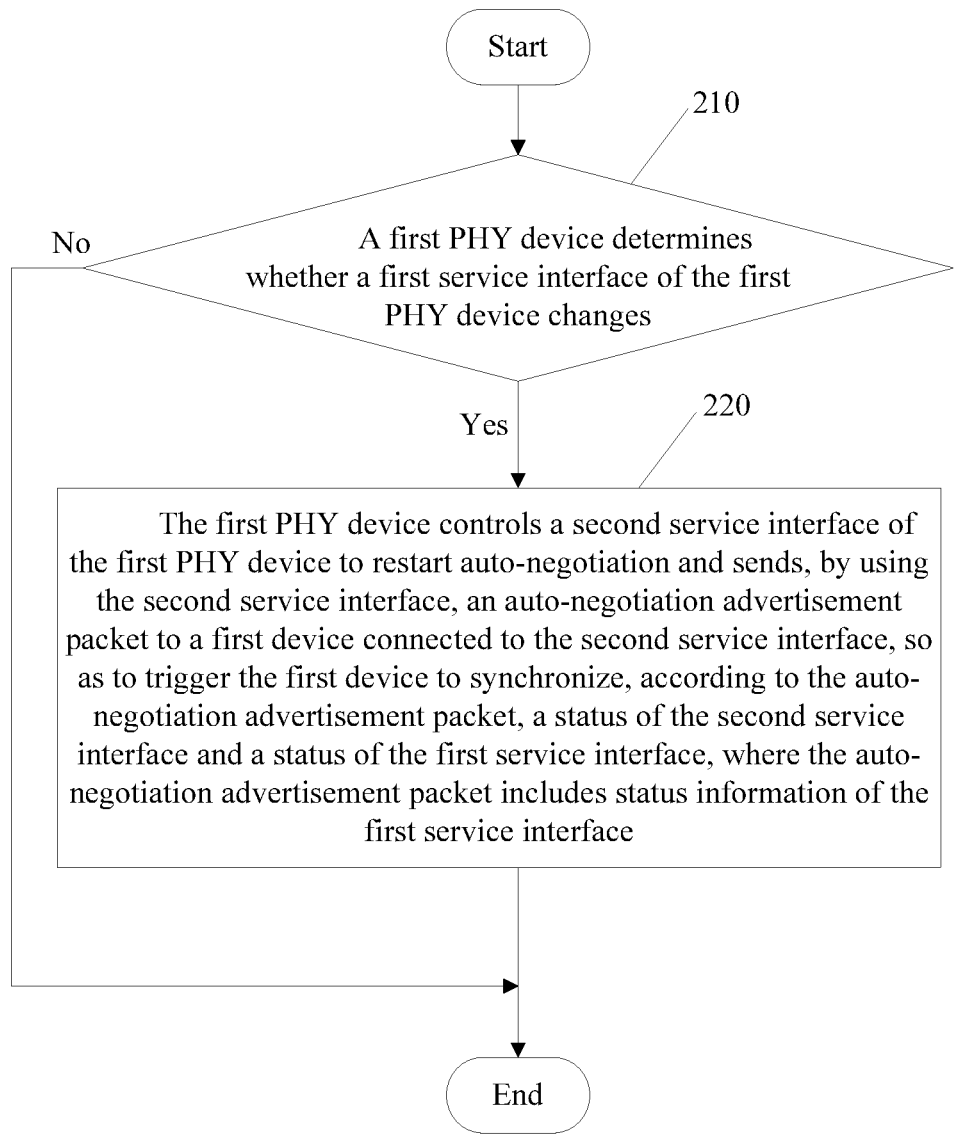
FIG. 2 is a flowchart of another port status synchronization method according to an embodiment of the present disclosure.

Referring to FIG. 2, FIG. 2 is a flowchart of another port status synchronization method according to an embodiment of the present disclosure. In the port status synchronization method provided in this embodiment, involved devices include a local device and a peer device. The local device includes a first MAC device and a first PHY device, where the first PHY device and the first MAC device are connected using a service interface. In this embodiment, the first PHY device includes two service interfaces, which are a first service interface and a second service interface. In this embodiment, the first service interface is a line side port, and the second service interface is a system side port, the first MAC device is connected to the first PHY device using the system side port of the first PHY device, that is, the first MAC device is connected to the first PHY device using the second service interface of the first PHY device, and the first PHY device is connected to the peer device using the line side port of the first PHY device, that is, the first PHY device is connected to the peer device using the first service interface of the first PHY device.

As shown in FIG. 2, the port status synchronization method provided in this embodiment is described using the first PHY device as an entity for performing steps of the method, and the method includes the following steps.

Step 210: The first PHY device determines whether the first service interface of the first PHY device changes. If it is determined that the first service interface of the first PHY device changes, step 220 is performed. If it is determined that the first service interface of the first PHY device does not change, this procedure ends.

Step 220: The first PHY device controls the second service interface of the first PHY device to restart auto-negotiation and sends, using the second service interface, an auto-negotiation advertisement packet to a first device connected to the second service interface in order to trigger the first device to synchronize, according to the auto-negotiation advertisement packet, a status of the second service interface and a status of the first service interface, where the auto-negotiation advertisement packet includes status information of the first service interface.

In this embodiment, if the first PHY device and the first MAC device are connected using the second service interface, the first device connected to the second service interface of the first PHY device is the first MAC device, that is, if the first PHY device is connected to the peer device using the first service interface of the first PHY device, the first device in step 220 is the first MAC device. The step described in step 220 is that the first PHY device controls the second service interface of the first PHY device to restart the auto-negotiation and sends, using the second service interface, the auto-negotiation advertisement packet to the first MAC device connected to the second service interface.

In an optional implementation manner, that the first PHY device and the first MAC device are connected using the service interface includes that the first PHY device and the first MAC device are connected using a service interface except a management interface. That is, in this embodiment, the first PHY device and the first MAC device are not connected using the management interface, but are connected using merely the service interface, where the service interface is not limited to the system side port of the first PHY device, and may be another service interface.

In an optional implementation manner, the service interface between the first MAC device and the first PHY device may be any interface of: a SGMII, a 1000BASE-X interface, a 1000BASE-KX interface, and a 10GBASE-KR interface.

In an optional implementation manner, a status of the system side port of the first PHY device or a status of the line side port of the first PHY device includes a port working mode, a port running status, or a control message.

In an optional implementation manner, at least two system side ports connected to different MAC devices are disposed in the first PHY device such that the first PHY device is connected to a MAC device using any one of the system side ports that is of the first PHY device and is corresponding to the MAC device.

In an optional implementation manner, the first MAC device is a device that includes an Ethernet MAC layer function, for example, the first MAC device may be any device of devices such as a network adapter device, a switch device, and a NP.

In an optional implementation manner, the first PHY device is a device that provides an Ethernet PHY layer interface, for example, the first PHY device may be a device that provides a 1000BASE-X interface, a 1000BASE-KX interface, a 10GBASE-KR interface, or a 10GBASE-SR interface.

Figure 3:
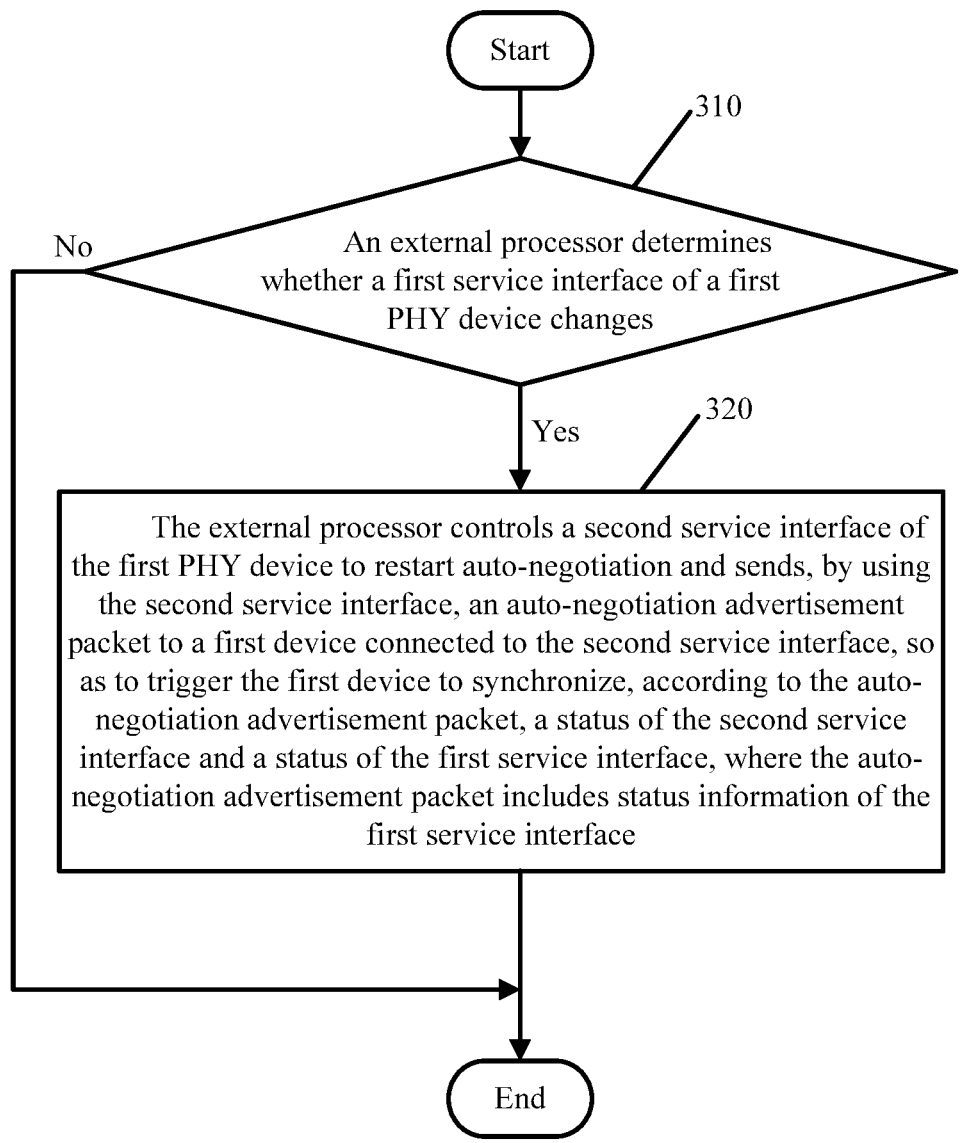
FIG. 3 is a flowchart of another port status synchronization method according to an embodiment of the present disclosure.

Referring to FIG. 3, FIG. 3 is a flowchart of another port status synchronization method according to an embodiment of the present disclosure. In the port status synchronization method provided in this embodiment, involved devices include a local device and a peer device. The local device includes a first MAC device, a first PHY device, and an external processor connected to the first PHY device, where the first PHY device and the first MAC device are connected using a service interface. In this embodiment, the first PHY device includes two service interfaces, which are a first service interface and a second service interface. In this embodiment, the first service interface is a system side port, and the second service interface is a line side port, the first MAC device is connected to the first PHY device using the system side port of the first PHY device, that is, the first MAC device is connected to the first PHY device using the first service interface of the first PHY device, and the first PHY device is connected to the peer device using the line side port of the first PHY device, that is, the first PHY device is connected to the peer device using the second service interface of the first PHY device.

As shown in FIG. 3, the port status synchronization method provided in this embodiment is described using the external processor as an entity for performing steps of the method, and the method includes the following steps.

Step 310: The external processor determines whether the first service interface of the first PHY device changes. If it is determined that the first service interface of the first PHY device changes, step 320 is performed. If it is determined that the first service interface of the first PHY device does not change, this procedure ends.

Step 320: The external processor controls the second service interface of the first PHY device to restart auto-negotiation and sends, using the second service interface, an auto-negotiation advertisement packet to a first device connected to the second service interface in order to trigger the first device to synchronize, according to the auto-negotiation advertisement packet, a status of the second service interface and a status of the first service interface, where the auto-negotiation advertisement packet includes status information of the first service interface.

In this embodiment, if the first PHY device and the first MAC device are connected using the first service interface, the first device connected to the second service interface of the first PHY device is the peer device, that is, if the first PHY device is connected to the peer device using the second service interface of the first PHY device, the first device in step 320 is the peer device. The step described in step 320 is that the first PHY device controls the second service interface of the first PHY device to restart the auto-negotiation and sends, using the second service interface, the auto-negotiation advertisement packet to the peer device connected to the second service interface.

In an optional implementation manner, that the first PHY device and the first MAC device are connected using the service interface includes that the first PHY device and the first MAC device are connected using a service interface except a management interface. That is, in this embodiment, the first PHY device and the first MAC device are not connected using the management interface, but are connected using merely the service interface, where the service interface is not limited to the system side port of the first PHY device, and may be another service interface.

In an optional implementation manner, the service interface between the first MAC device and the first PHY device may be any interface of a SGMII, a 1000BASE-X interface, a 1000BASE-KX interface, and a 10GBASE-KR interface.

In an optional implementation manner, a status of the system side port of the first PHY device or a status of the line side port of the first PHY device includes a port working mode, a port running status, or a control message.

In an optional implementation manner, at least two system side ports connected to different MAC devices are disposed in the first PHY device such that the first PHY device is connected to the MAC device using any one of the system side ports that is of the first PHY device and is corresponding to the MAC device.

In an optional implementation manner, the first MAC device is a device that includes an Ethernet MAC layer function, for example, the first MAC device may be any device of devices such as a network adapter device, a switch device, and a NP.

In an optional implementation manner, the first PHY device is a device that provides an Ethernet PHY layer interface, for example, the first PHY device may be a device that provides a 1000BASE-X interface, a 1000BASE-KX interface, a 10GBASE-KR interface, or a 10GBASE-SR interface.

According to this embodiment, an external processor connected to a first PHY device determines whether a first service interface of the first PHY device changes. If the first service interface of the first PHY device changes, the external processor connected to the first PHY device controls a second service interface of the first PHY device to restart auto-negotiation and sends, using the second service interface of the first PHY device, an auto-negotiation advertisement packet to a first device connected to the second service interface of the first PHY device in order to trigger the first device to synchronize, according to the auto-negotiation advertisement packet, a status of the second service interface of the first PHY device and a status of the first service interface of the first PHY device, where the auto-negotiation advertisement packet includes status information of the first service interface. In this way, a purpose of performing port status synchronization and negotiation between a first MAC device or a peer device of the first PHY device and the first PHY device using a service interface, without a need of disposing an MDIO interface to connect the first PHY device and the first MAC device, thereby simplifying troublesome design of a circuit interface when the first PHY device exchanges management information with the first MAC device and reducing space for signal cabling of an interface board. In this embodiment, an extra management channel and management module do not need to be disposed to connect the first PHY device and the first MAC device, thereby reducing an information exchange node during communication, simplifying an information transmission path, reducing an information transmission delay, receiving available information in a timely manner, and enhancing reliability of management information transmission.

Figure 4:
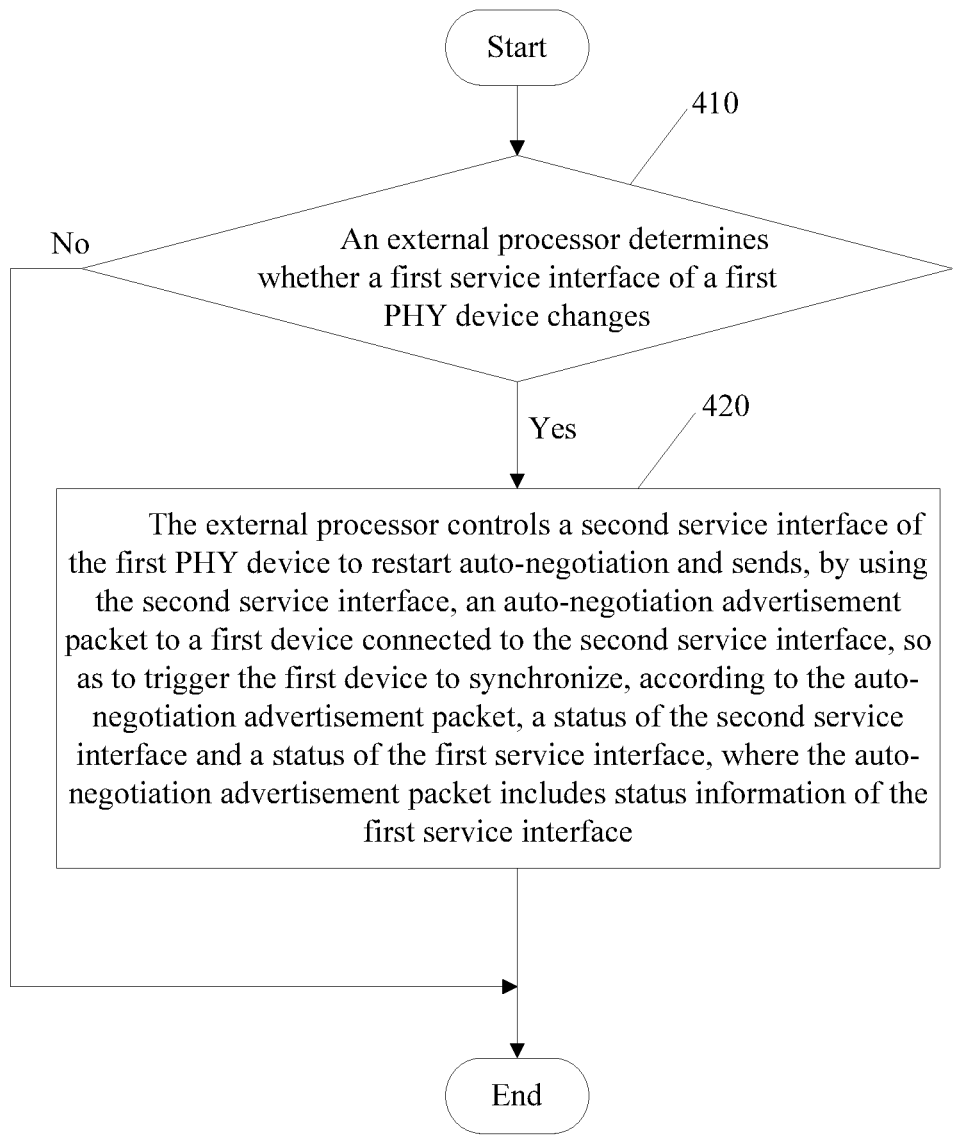
FIG. 4 is a flowchart of another port status synchronization method according to an embodiment of the present disclosure.

Referring to FIG. 4, FIG. 4 is a flowchart of another port status synchronization method according to an embodiment of the present disclosure. In the port status synchronization method provided in this embodiment, involved devices include a local device and a peer device. The local device includes a first MAC device, a first PHY device, and an external processor connected to the first PHY device, where the first PHY device and the first MAC device are connected using a service interface. In this embodiment, the first PHY device includes two service interfaces, which are a first service interface and a second service interface. In this embodiment, the first service interface is a line side port, and the second service interface is a system side port, the first MAC device is connected to the first PHY device using the system side port of the first PHY device, that is, the first MAC device is connected to the first PHY device using the second service interface of the first PHY device, and the first PHY device is connected to the peer device using the line side port of the first PHY device, that is, the first PHY device is connected to the peer device using the first service interface of the first PHY device.

As shown in FIG. 4, the port status synchronization method provided in this embodiment is described using the external processor as an entity for performing steps of the method, and the method includes the following steps.

Step 410: The external processor determines whether the first service interface of the first PHY device changes. If it is determined that the first service interface of the first PHY device changes, step 420 is performed. If it is determined that the first service interface of the first PHY device does not change, this procedure ends.

Step 420: The external processor controls the second service interface of the first PHY device to restart auto-negotiation and sends, using the second service interface, an auto-negotiation advertisement packet to a first device connected to the second service interface in order to trigger the first device to synchronize, according to the auto-negotiation advertisement packet, a status of the second service interface and a status of the first service interface, where the auto-negotiation advertisement packet includes status information of the first service interface.

In this embodiment, if the first PHY device and the first MAC device are connected using the second service interface, the first device connected to the second service interface of the first PHY device is the first MAC device, that is, if the first PHY device is connected to the peer device using the first service interface of the first PHY device, the first device in step 420 is the first MAC device. The step described in step 420 is that the first PHY device controls the second service interface of the first PHY device to restart the auto-negotiation and sends, using the second service interface, the auto-negotiation advertisement packet to the first MAC device connected to the second service interface.

In an optional implementation manner, that the first PHY device and the first MAC device are connected using the service interface includes that the first PHY device and the first MAC device are connected using a service interface except a management interface. That is, in this embodiment, the first PHY device and the first MAC device are not connected using the management interface, but are connected using merely the service interface, where the service interface is not limited to the system side port of the first PHY device, and may be another service interface.

In an optional implementation manner, the service interface between the first MAC device and the first PHY device may be any interface of a SGMII, a 1000BASE-X interface, a 1000BASE-KX interface, and a 10GBASE-KR interface.

In an optional implementation manner, a status of the system side port of the first PHY device or a status of the line side port of the first PHY device includes a port working mode, a port running status, or a control message.

In an optional implementation manner, at least two system side ports connected to different MAC devices are disposed in the first PHY device such that the first PHY device is connected to a MAC device using any one of the system side ports that is of the first PHY device and is corresponding to the MAC device.

In an optional implementation manner, the first MAC device is a device that includes an Ethernet MAC layer function, for example, the first MAC device may be any device of devices such as a network adapter device, a switch device, and a NP.

In an optional implementation manner, the first PHY device is a device that provides an Ethernet PHY layer interface, for example, the first PHY device may be a device that provides a 1000BASE-X interface, a 1000BASE-KX interface, a 10GBASE-KR interface, or a 10GBASE-SR interface.

Figure 5:
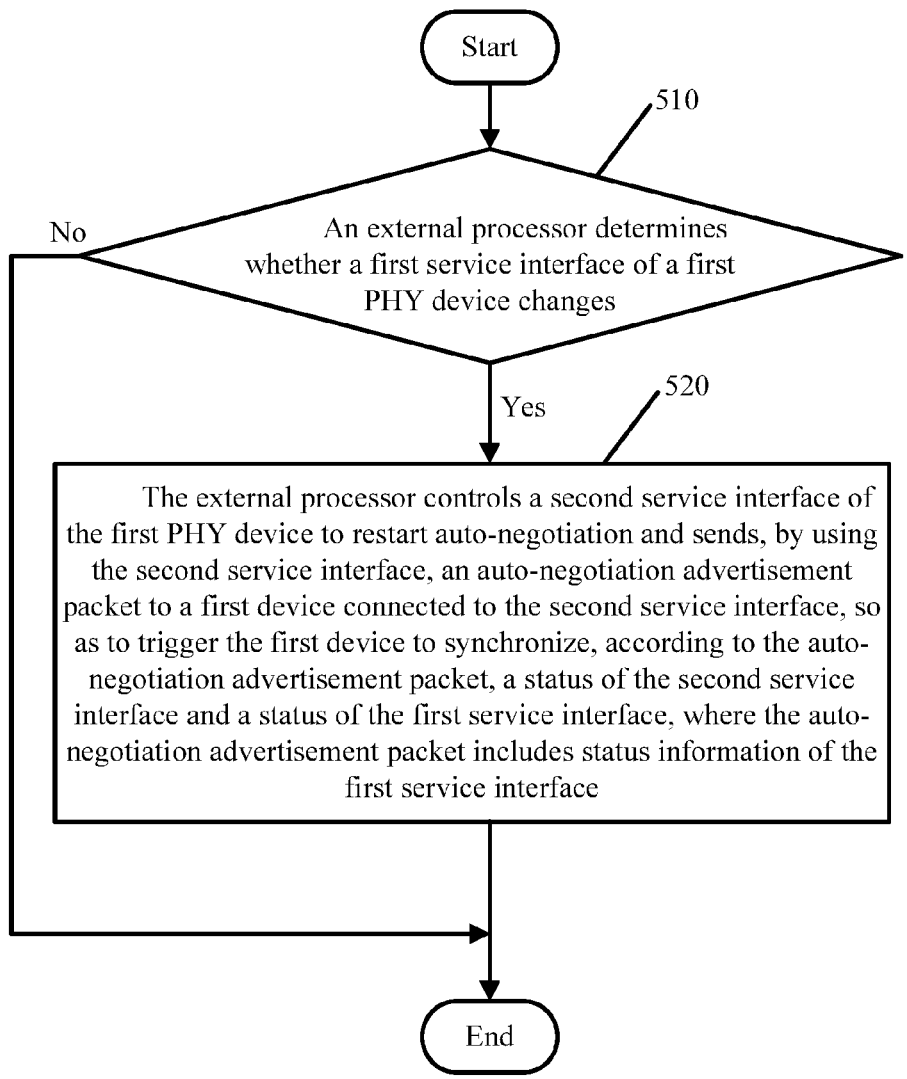
FIG. 5 is a flowchart of another port status synchronization method according to an embodiment of the present disclosure.

Referring to FIG. 5, FIG. 5 is a flowchart of another port status synchronization method according to an embodiment of the present disclosure. In the port status synchronization method provided in this embodiment, involved devices include a local device and a peer device. The local device includes a first MAC device, a first PHY device, and an external processor connected to the first PHY device, where the first PHY device and the first MAC device are connected using a service interface. In this embodiment, the first PHY device includes two service interfaces, which are a first service interface and a second service interface. In this embodiment, the first service interface is a line side port, and the second service interface is a system side port, the first MAC device is connected to the first PHY device using the system side port of the first PHY device, that is, the first MAC device is connected to the first PHY device using the second service interface of the first PHY device, and the first PHY device is connected to the peer device using the line side port of the first PHY device, that is, the first PHY device is connected to the peer device using the first service interface of the first PHY device. In this embodiment, that a change of a port working status of the first service interface is a change of a port working mode is used as an example for description in order to describe the port status synchronization method provided in this embodiment, where the port working mode includes a rate mode or a duplex mode. The rate mode is used as an example for description in this embodiment, that is, before a port status of the first service interface changes, the port working mode of the first service interface is that a port rate is 1000 megabits per second (Mbps). The port rate of the first service interface changes from 1000 Mbps to 100 Mbps. As shown in FIG. 5, the port status synchronization method provided in this embodiment is described using the external processor as an entity for performing steps of the method, and the method includes the following steps.

Step 510: The external processor determines whether the first service interface of the first PHY device changes. If it is determined that the first service interface of the first PHY device changes, that is, a port running status of the first service changes from a connected state to a disconnected state, step 520 is performed. If it is determined that the first service interface of the first PHY device does not change, this procedure ends.

Step 520: The external processor controls the second service interface of the first PHY device to restart auto-negotiation and sends, using the second service interface, an auto-negotiation advertisement packet to a first device connected to the second service interface in order to trigger the first device to synchronize, according to the auto-negotiation advertisement packet, a status of the second service interface and a status of the first service interface, where the auto-negotiation advertisement packet includes status information of the first service interface.

In this embodiment, if the first PHY device and the first MAC device are connected using the second service interface, the first device connected to the second service interface of the first PHY device is the first MAC device, that is, if the first PHY device is connected to the peer device using the first service interface of the first PHY device, the first device in step 520 is the first MAC device. The step described in step 520 is that the first PHY device controls the second service interface of the first PHY device to restart the auto-negotiation and sends, using the second service interface, the auto-negotiation advertisement packet to the first MAC device connected to the second service interface such that the first MAC device synchronizes a port rate of the second service interface to 100 Mbps, thereby achieving a purpose of synchronizing the status of the first service interface and the status of the second service interface, where the auto-negotiation advertisement packet includes that the status of the first service interface is that the rate is 100 Mbps.

In an optional implementation manner, based on steps 510 and 520 shown in FIG. 5, the method further includes the following steps: detecting, by the external processor, whether a preset first processing delay expires; if the external processor detects that the preset first processing delay expires, detecting whether the first service interface of the first PHY device is disconnected, and if it is detected that the first service interface of the first PHY device is not disconnected, performing subsequent step 520 and; if it is detected that the first service interface of the first PHY device is disconnected, controlling the first PHY device to disconnect the second service interface of the first PHY device.

In this embodiment, after it is detected that the status of the first service interface of the first PHY device changes, it is detected whether the preset first processing delay expires, and if the preset first processing delay expires, it is detected whether the first service interface of the first PHY device is disconnected, which can ensure that the port status of the first service interface is stable after the status of the first service interface of the first PHY device changes, and then the status of the first service interface of the first PHY device and the status of the second service interface are synchronized such that an increase of frequency of synchronization and negotiation between the status of the first service interface of the first PHY device and the status of the second service interface of the first PHY device caused by an unstable status of the first service interface of the first PHY device is avoided, thereby avoiding a waste of synchronization and negotiation resources.

In an optional implementation manner, that the first PHY device and the first MAC device are connected using the service interface includes that the first PHY device and the first MAC device are connected using a service interface except a management interface. That is, in this embodiment, the first PHY device and the first MAC device are not connected using the management interface, but are connected using merely the service interface, where the service interface is not limited to the system side port of the first PHY device, and may be another service interface.

In an optional implementation manner, the service interface between the first MAC device and the first PHY device may be any interface of a SGMII, a 1000BASE-X interface, a 1000BASE-KX interface, and a 10GBASE-KR interface.

In an optional implementation manner, a status of the system side port of the first PHY device or a status of the line side port of the first PHY device includes a port working mode, a port running status, or a control message.

In an optional implementation manner, at least two system side ports connected to different MAC devices are disposed in the first PHY device such that the first PHY device is connected to a MAC device using any one of the system side ports that is of the first PHY device and is corresponding to the MAC device.

In an optional implementation manner, the first MAC device is a device that includes an Ethernet MAC layer function, for example, the first MAC device may be any device of devices such as a network adapter device, a switch device, and a NP.

In an optional implementation manner, the first PHY device is a device that provides an Ethernet PHY layer interface, for example, the first PHY device may be a device that provides a 1000BASE-X interface, a 1000BASE-KX interface, a 10GBASE-KR interface, or a 10GBASE-SR interface.

According to the port status synchronization method provided in this embodiment, a problem that status information is transmitted between the system side port and the line side port of the first PHY device of the local device without using a management interface so as to implement status synchronization is specially solved, thereby implementing synchronization of statuses of the system side port and the line side port of the first PHY device.

In an optional implementation manner, the peer device includes a second PHY device and a second MAC device, a line side port of the second PHY device is connected to the line side port of the first PHY device, a system side port of the second PHY device is connected to the second MAC device, and the port status synchronization method provided in this embodiment further includes the following steps: determining, by the second PHY device or an external processor connected to the second PHY device, whether the line side port of the second PHY device changes, and if a status of the line side port of the second PHY device changes, controlling, by the second PHY device or the external processor connected to the second PHY device, the system side port of the second PHY device to restart auto-negotiation, and sending, using the system side port of the second PHY device, another auto-negotiation advertisement packet to the second MAC device connected to the system side port of the second PHY device in order to trigger the second MAC device to synchronize, according to the another auto-negotiation advertisement packet, the status of the line side port of the second PHY device and a status of the system side port of the second PHY device, where the another auto-negotiation advertisement packet includes status information of the line side port of the second PHY device.

According to the port status synchronization method provided in this embodiment, synchronization of statuses of ports connected between the local device and the peer device is implemented, and a port status synchronization method of the peer device is implemented. The port status synchronization method of the peer device may be implemented by referring to the port status synchronization method of the local device.

In an optional implementation manner, the line side port of the second PHY device of the peer device is a service interface between the second PHY device and the first PHY device, and the system side port of the second PHY device is a service interface between the second PHY device and the second MAC device.

In an optional implementation manner, the service interface between the second MAC device and the second PHY device may be any interface of a SGMII, a 1000BASE-X interface, a 1000BASE-KX interface, and a 10GBASE-KR interface.

In an optional implementation manner, the second MAC device is a device that includes an Ethernet MAC layer function, for example, the second MAC device may be any device of devices such as a network adapter device, a switch device, and a NP.

In an optional implementation manner, the second PHY device is a device that provides an Ethernet PHY layer interface, for example, the second PHY device may be a device that provides a 1000BASE-X interface, a 1000BASE-KX interface, a 10GBASE-KR interface, or a 10GBASE-SR interface.

Figure 6:
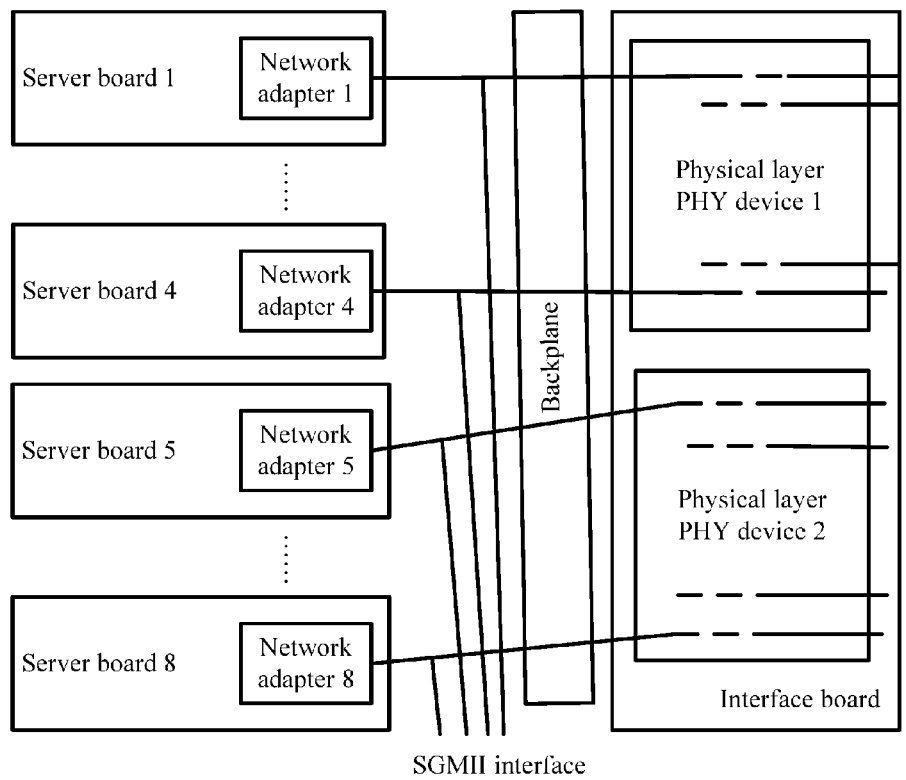
FIG. 6 is a schematic structural diagram of an apparatus to which a port status synchronization method is applied according to an embodiment of the present disclosure.

Referring to FIG. 6, FIG. 6 is a schematic structural diagram of an apparatus to which a port status synchronization method is applied according to an embodiment of the present disclosure. The port status synchronization method provided in this embodiment is applied to a blade server. The blade server includes at least one server board, and one network adapter is disposed on each server board. In this embodiment, a network adapter is a MAC device, and the blade server further includes an interface board, where at least one PHY device is disposed on the one interface board. In this embodiment, a MAC device and a PHY device are disposed on different physical boards. As shown in FIG. 6, eight server boards and one interface board are shown, and two PHY devices are disposed on the interface board, which are a PHY device 1 and a PHY device 2. Four system side ports are disposed in each of the PHY device 1 and the PHY device 2, the PHY device 1 is connected, using any system side port of the PHY device 1, to a MAC device corresponding to the any system side port, that is, the PHY device 1 is connected, using the any system side port of the PHY device 1, to a network adapter corresponding to the any system side port. The PHY device 2 is connected, using any system side port of the PHY device 2, to a MAC device corresponding to the any system side port, that is, the PHY device 2 is connected, using the any system side port of the PHY device 2, to a network adapter corresponding to the any system side port. A system side port of the PHY device 1 provided in this embodiment may be connected to a corresponding network adapter using an SGMII interface, and an auto-negotiation mechanism between the system side port and the network adapter follows an auto-negotiation mechanism of a 1000BASE-X interface, that is, follows the Institute of Electrical and Electronics Engineers (IEEE) 802.3 Clause 37 specification. The SGMII interface is disposed on a backplane.

In this embodiment, a process of the port status synchronization method provided in this embodiment is described using that a status change of a line side port of the PHY device 1 is a rate change as an example. A specific implementation process is described as follows.

(1) The line side port of the PHY device 1 originally works in a 1000BASE-T mode at a rate of 1000 Mbps.

(2) The line side port of the PHY device 1 restarts auto-negotiation with a peer device, to change the rate to 100 Mbps.

(3) The PHY device 1 determines that a status of the line side port changes, and then a system side port is initialized and auto-negotiation is restarted in order to write information about a rate of 100 Mbps into an auto-negotiation packet, and advertise the information to any one or all of network adapters 1 to 4 using the system side port.

(4) After any one or all of the network adapters 1 to 4 detect that the system side port is initialized, auto-negotiation is restarted, and a working rate that can be supported by the line side port and is acquired from the auto-negotiation packet sent by the PHY device 1 is 100 Mbps, and then, a rate of the system side port is set to 100 Mbps such that synchronization of rates of the system side port and the line side port of the PHY device 1 is implemented, auto-negotiation of an interface between the network adapters 1 to 4 and the PHY device 1 is completed, and a link is linked up anew.

By comparing this embodiment with the prior art, and by analyzing another existing implementation method for connecting a management data interface, it can be learned that in an existing synchronization method, an external processor is connected to a MAC device using a control management interface in order to acquire status information, in an Eth interface, of a system side port that is connected to the MAC device, and the external processor is connected to a PHY device using an MDIO interface in order to directly acquire status information of a PHY line side port of the PHY device using the MDIO interface such that the external processor delivers an instruction to control status synchronization between a PHY system side port and the PHY line side port of the PHY device. In an apparatus that implements a connection of such a management data interface, a PHY device and a MAC device are disposed on different physical boards, and the PHY device and an external processor are disposed on a same physical board and one system device management module is disposed, where the system device management module is connected to the external processor using a device management channel, and the external processor is connected to the PHY device using an MDIO interface. In this way, the system device management module acquires port status information on a PHY line side from the external processor and acquires port status information on a PHY system side from the MAC device, and delivers an instruction to control status synchronization between a PHY system side port and a PHY line side port of the PHY device. Because the system device management module is independent of the external processor, a quantity of information transmission paths is relatively large, and a signal connection is complex and troublesome, thereby increasing a communications node, increasing a processing delay of a signal, and reducing reliability of communication between a MAC and a PHY. However, in conclusion, in this embodiment, a PHY device or an external processor connected to a PHY device determines whether a first service interface of the PHY device changes; if the first service interface of the PHY device changes, the PHY device or the external processor controls a second service interface of the PHY device to restart auto-negotiation and sends, using the second service interface, an auto-negotiation advertisement packet to a first device connected to the second service interface in order to trigger the first device to synchronize, according to the auto-negotiation advertisement packet, a status of the second service interface and a status of the first service interface, where the auto-negotiation advertisement packet includes status information of the first service interface. In this way, a purpose of performing port status synchronization and negotiation between a MAC device or a peer device of the PHY device and the PHY device using a service interface, without a need of disposing an MDIO interface to connect the PHY device and the MAC device, thereby simplifying troublesome design of a circuit interface when the PHY device exchanges management information with the MAC device and reducing space for signal cabling of an interface board. In this embodiment, an extra management channel and management module do not need to be disposed to connect the PHY device and the MAC device, thereby reducing an information exchange node during communication, simplifying an information transmission path, reducing an information transmission delay, receiving available information in a timely manner, and enhancing reliability of management information transmission.

Figure 7:
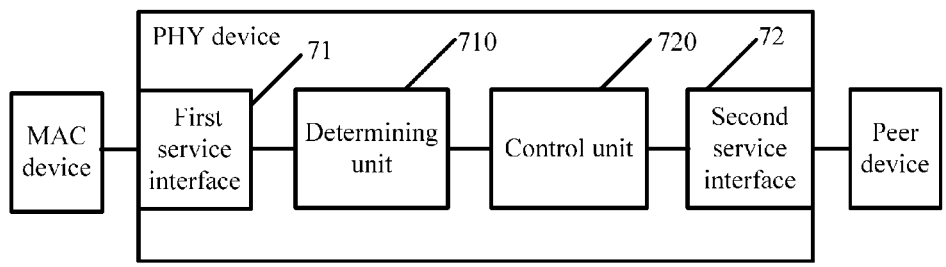
FIG. 7 is a structural diagram of a PHY device according to an embodiment of the present disclosure.

Referring to FIG. 7, FIG. 7 is a structural diagram of a PHY device according to an embodiment of the present disclosure. The PHY device in this embodiment includes two service interfaces, and the PHY device and a MAC device are connected using a service interface. As shown in FIG. 7, the two service interfaces included in the PHY device provided in this embodiment are a first service interface 71 and a second service interface 72. In this embodiment, the first service interface 71 is a system side port, and the second service interface 72 is a line side port, the MAC device is connected to the PHY device using the system side port of the PHY device, that is, the MAC device is connected to the PHY device using the first service interface 71 of the PHY device, and the PHY device is connected to a peer device using the line side port of the PHY device, that is, the PHY device is connected to the peer device using the second service interface 72 of the PHY device. The PHY device further includes a determining unit 710 and a control unit 720, where an internal connection situation of the PHY device is described in the following.

In this embodiment, the determining unit 710 is configured to determine whether the first service interface 71 of the PHY device changes.

The control unit 720 is configured to control, according to a result that the determining unit 710 determines that the first service interface 71 of the PHY device changes, the second service interface 72 of the PHY device to restart auto-negotiation, and send, using the second service interface 72, an auto-negotiation advertisement packet to a first device connected to the second service interface 72 in order to trigger the first device to synchronize, according to the auto-negotiation advertisement packet, a status of the second service interface 72 and a status of the first service interface 71, where the auto-negotiation advertisement packet includes status information of the first service interface 71.

In this embodiment, if the PHY device and the MAC device are connected using the first service interface 71, the first device and the MAC device are different devices, that is, the first device is the peer device.

In an optional implementation manner, that the PHY device and the MAC device are connected using the service interface includes that the PHY device and the MAC device are connected using a service interface except a management interface. That is, in this embodiment, the PHY device and the MAC device are not connected using the management interface, but are connected using merely the service interface, where the service interface is not limited to the system side port of the PHY device, and may be another service interface.

In an optional implementation manner, the service interface between the MAC device and the PHY device may be any interface of a SGMII, a 1000BASE-X interface, a 1000BASE-KX interface, and a 10GBASE-KR interface.

In an optional implementation manner, a status of the system side port of the PHY device or a status of the line side port of the PHY device includes a port working mode, a port running status, or a control message.

In an optional implementation manner, at least two system side ports connected to different MAC devices are disposed in the PHY device such that the PHY device is connected to the MAC device using any one of the system side ports that is of the PHY device and is corresponding to the MAC device.

In an optional implementation manner, the MAC device is a device that includes an Ethernet MAC layer function, for example, the MAC device may be any device of devices such as a network adapter device, a switch device, and a NP.

In an optional implementation manner, the PHY device is a device that provides an Ethernet PHY layer interface, for example, the PHY device may be a device that provides a 1000BASE-X interface, a 1000BASE-KX interface, a 10GBASE-KR interface, or a 10GBASE-SR interface.

Figure 8:
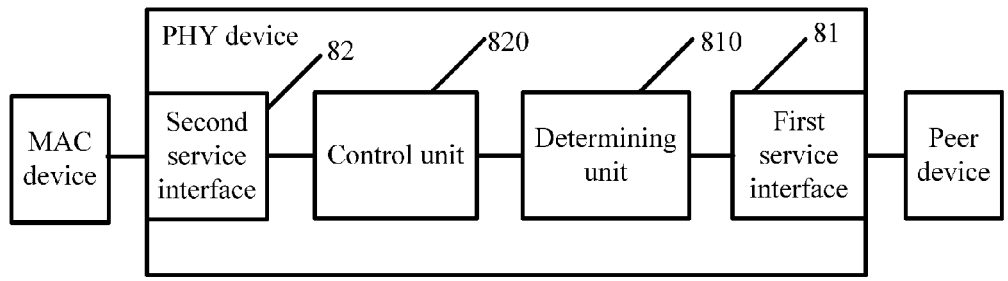
FIG. 8 is a structural diagram of another PHY device according to an embodiment of the present disclosure.

Referring to FIG. 8, FIG. 8 is a structural diagram of another PHY device according to an embodiment of the present disclosure. The PHY device in this embodiment includes two service interfaces, and the PHY device and a MAC device are connected using a service interface. As shown in FIG. 8, the two service interfaces included in the PHY device provided in this embodiment are a first service interface 81 and a second service interface 82. In this embodiment, the first service interface 81 is a line side port, and the second service interface 82 is a system side port, the MAC device is connected to the PHY device using the system side port of the PHY device, that is, the MAC device is connected to the PHY device using the second service interface of the PHY device, and the PHY device is connected to a peer device using the line side port of the PHY device, that is, the PHY device is connected to the peer device using the first service interface of the PHY device. The PHY device further includes a determining unit 810 and a control unit 820, where an internal connection situation of the PHY device is described in the following.

In this embodiment, the determining unit 810 is configured to determine whether the first service interface 81 of the PHY device changes.

The control unit 820 is configured to control, according to a result that the determining unit 810 determines that the first service interface 81 of the PHY device changes, the second service interface 82 of the PHY device to restart auto-negotiation. and send, using the second service interface 82, an auto-negotiation advertisement packet to a first device connected to the second service interface 82 in order to trigger the first device to synchronize, according to the auto-negotiation advertisement packet, a status of the second service interface 82 and a status of the first service interface 81, where the auto-negotiation advertisement packet includes status information of the first service interface 81.

In this embodiment, if the PHY device and the MAC device are connected using the second service interface 82, the first device and the MAC device are the same device, that is, the first device is the MAC device.

In an optional implementation manner, that the PHY device and the MAC device are connected using the service interface includes that the PHY device and the MAC device are connected using a service interface except a management interface. That is, in this embodiment, the PHY device and the MAC device are not connected using the management interface, but are connected using merely the service interface, where the service interface is not limited to the system side port of the PHY device, and may be another service interface.

In an optional implementation manner, the service interface between the MAC device and the PHY device may be any interface of a serial gigabit media independent interface SGMII, a 1000BASE-X interface, a 1000BASE-KX interface, and a 10GBASE-KR interface.

In an optional implementation manner, a status of the system side port of the PHY device or a status of the line side port of the PHY device includes a port working mode, a port running status, or a control message.

In an optional implementation manner, at least two system side ports connected to different MAC devices are disposed in the PHY device such that the PHY device is connected to the MAC device using any one of the system side ports that is of the PHY device and is corresponding to the MAC device.

In an optional implementation manner, the MAC device is a device that includes an Ethernet MAC layer function, for example, the MAC device may be any device of devices such as a network adapter device, a switch device, and a NP.

In an optional implementation manner, the PHY device is a device that provides an Ethernet PHY layer interface, for example, the PHY device may be a device that provides a 1000BASE-X interface, a 1000BASE-KX interface, a 10GBASE-KR interface, or a 10GBASE-SR interface.

Figure 9:
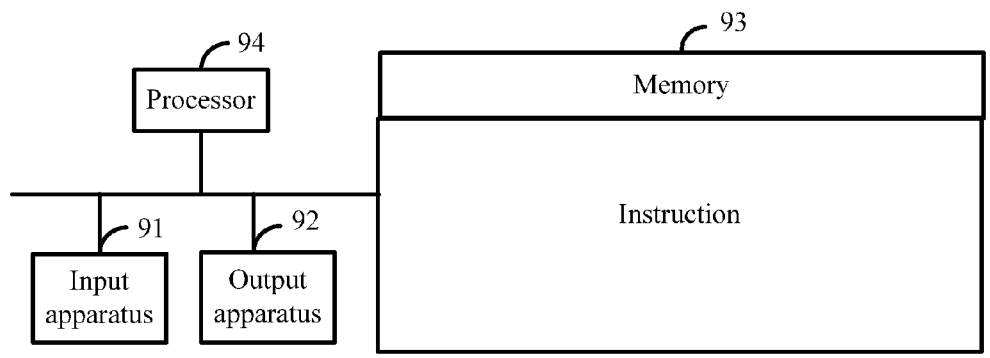
FIG. 9 is a structural diagram of another PHY device according to an embodiment of the present disclosure.

Referring to FIG. 9, FIG. 9 is a structural diagram of another PHY device according to an embodiment of the present disclosure. As shown in FIG. 9, the PHY device provided in this embodiment includes an input apparatus 91, an output apparatus 92, a memory 93, and a processor 94, where the memory 93 stores a group of program code, and the processor 94 is configured to invoke the program code stored in the memory 93 in order to execute the following operations: determining whether a first service interface of the PHY device changes, and if the first service interface of the PHY device changes, controlling a second service interface of the PHY device to restart auto-negotiation, and sending, using the second service interface, an auto-negotiation advertisement packet to a first device connected to the second service interface in order to trigger the first device to synchronize, according to the auto-negotiation advertisement packet, a status of the second service interface and a status of the first service interface, where the auto-negotiation advertisement packet includes status information of the first service interface, where if the PHY device and the MAC device are connected using the second service interface, the first device is the MAC device. Otherwise, the first device and the MAC device are different devices.

In an optional implementation manner, that the PHY device and the MAC device are connected using the service interface includes that the PHY device and the MAC device are connected using a service interface except a management interface.

In an optional implementation manner, if the first service interface is a line side port of the PHY device, the second service interface is a system side port of the PHY device, and that the PHY device and the link layer MAC device are connected using the service interface includes that the PHY device and the MAC device are connected using the system side port of the PHY device, and the first device is the MAC device connected to the system side port of the PHY device.

In an optional implementation manner, if the first service interface is a system side port of the PHY device, the second service interface is a line side port of the PHY device, and that the PHY device and the MAC device are connected using the service interface includes that the PHY device and the MAC device are connected using the system side port of the PHY device, and the first device is a peer device connected to the line side port of the PHY device.

In an optional implementation manner, a status of the system side port of the PHY device or a status of the line side port of the PHY device includes a port working mode, a port running status, or a control message.

In an optional implementation manner, at least two system side ports connected to different MAC devices are disposed in the PHY device such that the PHY device is connected to the MAC device using any one of the system side ports that is of the PHY device and is corresponding to the MAC device.

Figure 10:
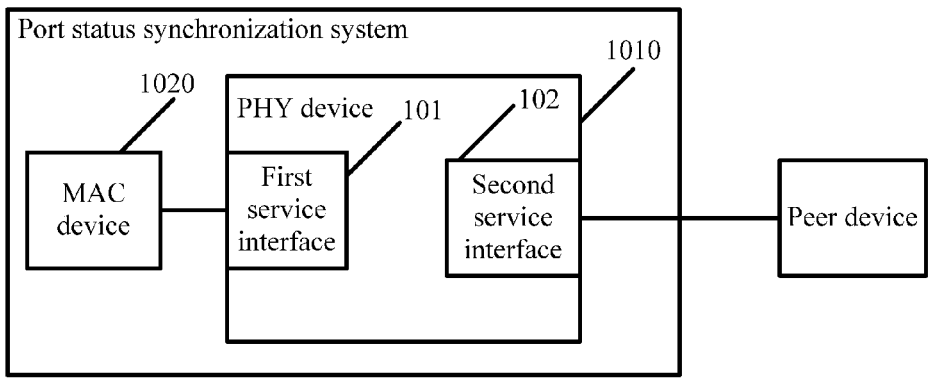
FIG. 10 is a structural diagram of a port status synchronization system according to an embodiment of the present disclosure.

Referring to FIG. 10, FIG. 10 is a structural diagram of a port status synchronization system according to an embodiment of the present disclosure. As shown in FIG. 10, the port status synchronization system provided in this embodiment includes a PHY device 1010 and a MAC device 1020, where the PHY device 1010 and the MAC device 1020 are connected using a service interface, and the PHY device 1010 includes a first service interface 101 and a second service interface 102. In this embodiment, the first service interface 101 is a system side port, and the second service interface 102 is a line side port, the MAC device 1020 is connected to the PHY device 1010 using the system side port of the PHY device 1010, that is, the MAC device 1020 is connected to the PHY device 1010 using the first service interface 101 of the PHY device 1010, and the PHY device 1010 is connected to a peer device using the line side port of the PHY device 1010, that is, the PHY device 1010 is connected to the peer device using the second service interface 102 of the PHY device 1010.

The PHY device 1010 is configured to determine whether the first service interface 101 of the PHY device 1010 changes.

The PHY device 1010 is further configured to control, according to a result that the PHY device 1010 determines that the first service interface 101 of the PHY device 1010 changes, the second service interface 102 of the PHY device 1010 to restart auto-negotiation, and send, using the second service interface 102, an auto-negotiation advertisement packet to a first device connected to the second service interface 102 in order to trigger the first device to synchronize, according to the auto-negotiation advertisement packet, a status of the second service interface 102 and a status of the first service interface 101, where the auto-negotiation advertisement packet includes status information of the first service interface 101.

In this embodiment, if the PHY device 1010 and the MAC device 1020 are connected using the first service interface 101, the first device and the MAC device 1020 are different devices, that is, the first device is the peer device.

In an optional implementation manner, that the PHY device and the MAC device are connected using the service interface includes that the PHY device and the MAC device are connected using a service interface except a management interface. That is, in this embodiment, the PHY device and the MAC device are not connected using the management interface, but are connected using merely the service interface, where the service interface is not limited to the system side port of the PHY device, and may be another service interface.

In an optional implementation manner, the service interface between the MAC device and the PHY device may be any interface of a SGMII, a 1000BASE-X interface, a 1000BASE-KX interface, and a 10GBASE-KR interface.

In an optional implementation manner, a status of the system side port of the PHY device or a status of the line side port of the PHY device includes a port working mode, a port running status, or a control message.

In an optional implementation manner, at least two system side ports connected to different MAC devices are disposed in the PHY device such that the PHY device is connected to the MAC device using any one of the system side ports that is of the PHY device and is corresponding to the MAC device.

In an optional implementation manner, the MAC device is a device that includes an Ethernet MAC layer function, for example, the MAC device may be any device of devices such as a network adapter device, a switch device, and a NP.

In an optional implementation manner, the PHY device is a device that provides an Ethernet PHY layer interface, for example, the PHY device may be a device that provides a 1000BASE-X interface, a 1000BASE-KX interface, a 10GBASE-KR interface, or a 10GBASE-SR interface.

Figure 11:
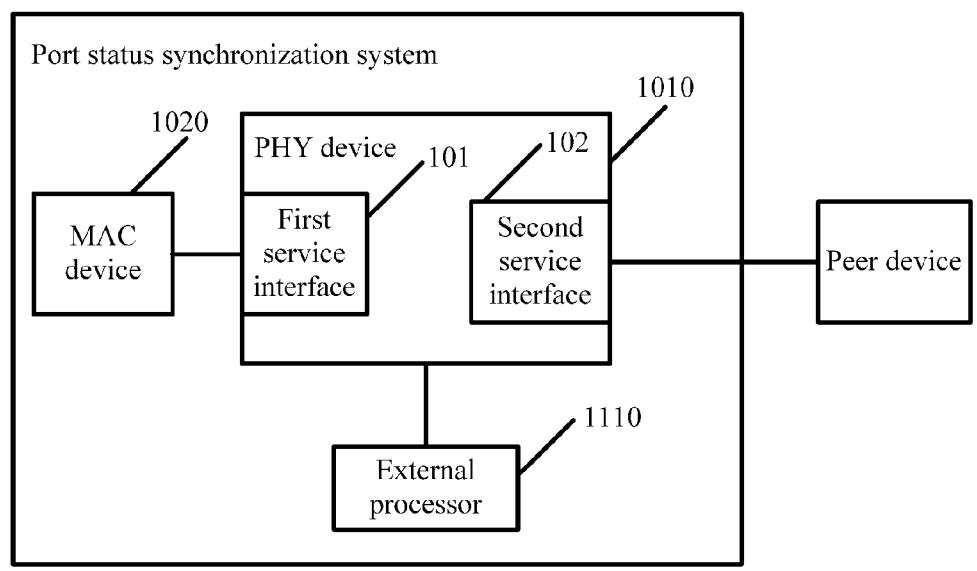
FIG. 11 is a structural diagram of another port status synchronization system according to an embodiment of the present disclosure.

In an optional implementation manner, referring to FIG. 11, FIG. 11 is a structural diagram of another port status synchronization system according to an embodiment of the present disclosure. As shown in FIG. 11, this port status synchronization system is based on the port status synchronization system shown in FIG. 10, and further includes an external processor 1110, where the external processor 1110 is connected to the PHY device 1010, and is configured to replace the PHY device 1010 to determine whether the first service interface 101 of the PHY device 1010 changes.

The external processor 1110 is further configured to replace the PHY device 1010 to control, according to a result that the external processor 1110 determines that the first service interface 101 of the PHY device 1010 changes, the second service interface 102 of the PHY device 1010 to restart auto-negotiation, and send, using the second service interface 102, an auto-negotiation advertisement packet to the first device connected to the second service interface 102 in order to trigger the first device to synchronize, according to the auto-negotiation advertisement packet, the status of the second service interface 101 and the status of the first service interface 101.

In this embodiment, if the PHY device 1010 and the MAC device 1020 are connected using the first service interface 101, the first device and the MAC device 1020 are different devices, that is, the first device is the peer device.

In an optional implementation manner, that the PHY device and the MAC device are connected using the service interface includes that the PHY device and the MAC device are connected using a service interface except a management interface.

In an optional implementation manner, if the first service interface is a line side port of the PHY device, the second service interface is a system side port of the PHY device, and that the PHY device and the link layer MAC device are connected using the service interface includes that the PHY device and the link layer MAC device are connected using the system side port of the PHY device, and in this embodiment, the first device is the MAC device connected to the system side port of the PHY device.

In an optional implementation manner, a status of the system side port of the PHY device or a status of the line side port of the PHY device includes a port working mode, a port running status, or a control message.

In an optional implementation manner, at least two system side ports connected to different MAC devices are disposed in the PHY device such that the PHY device is connected to the MAC device using any one of the system side ports that is of the PHY device and is corresponding to the MAC device.

The PHY device included in the port status synchronization system implemented in this embodiment may be implemented according to the PHY device in any one of the port status synchronization methods implemented in FIG. 1 to FIG. 6, and for details about specific implementation, reference may be made to any one of the method embodiments shown in FIG. 1 to FIG. 6, which are not described herein again.

In the several embodiments provided in the present application, it should be understood that the disclosed device and method may be implemented in other manners. For example, the described device embodiment is merely exemplary. For example, the module or unit division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented using some interfaces. The indirect couplings or communication connections between the apparatuses, modules, or units may be implemented in electronic, mechanical, or other forms.

The modules or units described as separate parts may or may not be physically separate, and parts displayed as modules or units may or may not be physical modules or units, may be located in one position, or may be distributed on a plurality of network modules or units. Some or all of the modules or units may be selected according to actual needs to achieve the objectives of the solutions in the embodiments of the present disclosure.

The foregoing descriptions are merely specific implementation manners of the present disclosure, but are not intended to limit the protection scope of the present disclosure. Any equivalent modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A port status synchronization method, wherein a physical layer (PHY) device and a media access control (MAC) device are connected using at least one of a first service interface or a second service interface, and wherein the method comprises:
   determining, by the PHY device or an external processor connected to the PHY device, whether the first service interface of the PHY device changes;
   controlling, by the PHY device or the external processor, the second service interface of the PHY device to restart auto-negotiation when the first service interface of the PHY device changes; and
   sending, using the second service interface, an auto-negotiation advertisement packet to a first device connected to the second service interface in order to trigger the first device to synchronize, according to the auto-negotiation advertisement packet, a status of the second service interface and a status of the first service interface, and wherein the auto-negotiation advertisement packet comprises status information of the first service interface,
   wherein when the first device is the MAC device, the PHY device and the MAC device are connected by using the second service interface, wherein the PHY device and a peer device are connected by using the first service interface, and wherein the peer device comprises a second PHY device and a second MAC device, and
   wherein when the first device is a peer device, the PHY device and the MAC device are connected by using the first service interface, wherein the PHY device and the peer device are connected by using the second service interface, and wherein the peer device comprises a second PHY device and a second MAC device.

2. The method according to claim 1, wherein the PHY device and the MAC device are connected using the first service interface and absent a management interface.

3. The method according to claim 2, wherein when the first service interface is a line side port of the PHY device, and the second service interface is a system side port of the PHY device, the PHY device and the MAC device are connected using the system side port of the PHY device, and wherein the first device is the MAC device connected to the system side port of the PHY device.

4. The method according to claim 2, wherein when the first service interface is a system side port of the PHY device, and the second service interface is a line side port of the PHY device, the PHY device and the MAC device are connected using the system side port of the PHY device, and wherein the first device is a peer device connected to the line side port of the PHY device.

5. The method according to claim 3, wherein a status of the system side port of the PHY device or a status of the line side port of the PHY device comprises a port working mode, a port running status, or a control message.

6. The method according to claim 5, wherein at least two system side ports connected to different MAC devices are disposed in the PHY device such that the PHY device is connected to the MAC device using any system side port of the PHY device and corresponding to the MAC device.

7. A physical layer (PHY) device, wherein the PHY device and a media access control (MAC) device are connected using at least one of a first service interface or a second service interface, wherein the PHY device comprises:
   the first service interface;
   the second service interface;
   a memory; and
   a processor coupled to the memory, the first service interface, and the second service interface, and wherein the processor is configured to:
      determine whether the first service interface of the PHY device changes; and
      control, when the first service interface of the PHY device changes, the second service interface of the PHY device to restart auto-negotiation; and
      send, using the second service interface, an auto-negotiation advertisement packet to a first device connected to the second service interface in order to trigger the first device to synchronize, according to the auto-negotiation advertisement packet, a status of the second service interface and a status of the first service interface, and wherein the auto-negotiation advertisement packet comprises status information of the first service interface,
   wherein when the first device is the MAC device, the PHY device and the MAC device are connected by using the second service interface, wherein the PHY device and a peer device are connected by using the first service interface, and wherein the peer device comprises a second PHY device and a second MAC device, and
   wherein when the first device is a peer device, the PHY device and the MAC device are connected by using the first service interface, wherein the PHY device and the peer device are connected by using the second service interface, and wherein the peer device comprises a second PHY device and a second MAC device.

8. The PHY device according to claim 7, wherein the PHY device and the MAC device are connected using the first service interface and absent a management interface.

9. The PHY device according to claim 8, wherein when the first service interface is a line side port of the PHY device, and the second service interface is a system side port of the PHY device, the PHY device and the MAC device are connected using the system side port of the PHY device, and wherein the first device is the MAC device connected to the system side port of the PHY device.

10. The PHY device according to claim 8, wherein when the first service interface is a system side port of the PHY device, and the second service interface is a line side port of the PHY device, the PHY device and the MAC device are connected using the system side port of the PHY device, and wherein the first device is a peer device connected to the line side port of the PHY device.

11. The PHY device according to claim 9, wherein a status of the system side port of the PHY device or a status of the line side port of the PHY device comprises a port working mode, a port running status, or a control message.

12. The PHY device according to claim 11, wherein at least two system side ports connected to different MAC devices are disposed in the PHY device such that the PHY device is connected to the MAC device using any system side port of the PHY device and corresponding to the MAC device.

13. A port status synchronization system, comprising:
   a physical layer (PHY) device; and
   a media access control (MAC) device,
   wherein the PHY device and the MAC device are connected using at least one of a first service interface or a second service interface, wherein the PHY device comprises:
the first service interface; and
the second service interface,
wherein the PHY device is configured to:
determine whether the first service interface of the PHY device changes;
control, when the first service interface of the PHY device changes, the second service interface of the PHY device to restart auto-negotiation; and
send, using the second service interface, an auto-negotiation advertisement packet to a first device connected to the second service interface in order to trigger the first device to synchronize, according to the auto-negotiation advertisement packet, a status of the second service interface and a status of the first service interface, and wherein the auto-negotiation advertisement packet comprises status information of the first service interface,
wherein when the first device is the MAC device, the PHY device and the MAC device are connected by using the second service interface, wherein the PHY device and a peer device are connected by using the first service interface, and wherein the peer device comprises a second PHY device and a second MAC device, and
wherein when the first device is a peer device, the PHY device and the MAC device are connected by using the first service interface, wherein the PHY device and the peer device are connected by using the second service interface, and wherein the peer device comprises a second PHY device and a second MAC device.

14. The system according to claim 13, further comprising an external processor, wherein the external processor is connected to the PHY device, and is configured to:
replace the PHY device to determine whether the first service interface of the PHY device changes;
replace the PHY device to control, when the external processor determines that the first service interface of the PHY device changes, the second service interface of the PHY device to restart auto-negotiation; and
replace the PHY device to send, using the second service interface, the auto-negotiation advertisement packet to the first device connected to the second service interface.

15. The system according to claim 13, wherein the PHY device and the MAC device are connected using the first service interface and absent a management interface.

16. The system according to claim 15, wherein when the first service interface is a line side port of the PHY device, and the second service interface is a system side port of the PHY device, the PHY device and the MAC device are connected using the system side port of the PHY device, and wherein the first device is the MAC device connected to the system side port of the PHY device.

17. The system according to claim 15, wherein when the first service interface is a system side port of the PHY device, and the second service interface is a line side port of the PHY device, the PHY device and the MAC device are connected using the system side port of the PHY device, and wherein the first device is a peer device connected to the line side port of the PHY device.

18. The system according to claim 17, wherein a status of the system side port of the PHY device or a status of the line side port of the PHY device comprises a port working mode, a port running status, or a control message.

19. The system according to claim 18, wherein at least two system side ports connected to different MAC devices are disposed in the PHY device such that the PHY device is connected to the MAC device using any system side port of the PHY device and corresponding to the MAC device.

20. A physical layer (PHY) device, comprising:
an input apparatus;
an output apparatus;
a memory; and
a processor, wherein the input apparatus, the output apparatus, the memory and the processor are connected to each other, wherein the memory stores a group of program code, and wherein the processor is configured to invoke the program code stored in the memory in order to execute the following operations:
determine whether a first service interface of the PHY device changes;
control a second service interface of the PHY device to restart auto-negotiation when the first service interface of the PHY device changes; and
send, using the second service interface, an auto-negotiation advertisement packet to a first device connected to the second service interface in order to trigger the first device to synchronize, according to the auto-negotiation advertisement packet, a status of the second service interface and a status of the first service interface, wherein the auto-negotiation advertisement packet includes status information of the first service interface, wherein when the first device is the MAC device, the PHY device and the MAC device are connected by using the second service interface, wherein the PHY device and a peer device are connected by using the first service interface, and wherein the peer device comprises a second PHY device and a second MAC device, and wherein when the first device is a peer device, the PHY device and the MAC device are connected by using the first service interface, wherein the PHY device and the peer device are connected by using the second service interface, and wherein the peer device comprises a second PHY device and a second MAC device.

\* \* \* \* \*